United States Patent [19]

King et al.

[11] 4,227,661
[45] Oct. 14, 1980

[54] LATCHING MECHANISM AND WINDING APPARATUS INCLUDING SAME

[76] Inventors: William King; Edward King, both of 79 Allison Rd., Elsternwick, Victoria, Australia, 3122

[21] Appl. No.: 928,066

[22] Filed: Jul. 28, 1978

Related U.S. Application Data

[63] Continuation-in-part of Ser. No. 698,308, Jun. 21, 1976, abandoned.

[30] Foreign Application Priority Data

Jun. 23, 1975 [AU] Australia .............................. PC2076

[51] Int. Cl.³ ............................................. B65H 75/48
[52] U.S. Cl. ............................. 242/107.7; 137/355.27
[58] Field of Search ............. 242/107.7, 107.6, 107.12, 242/107.4 R, 107.4 E; 74/577 R, 577 S, 577 M; 137/355.12, 355.16, 355.19, 355.26, 355.27; 160/301–303, 305; 188/82.7

[56] References Cited

U.S. PATENT DOCUMENTS

| | | | |
|---|---|---|---|
| 355,643 | 1/1887 | Du Shane | 242/107.7 X |
| 1,441,572 | 1/1923 | France | 242/107.7 |
| 1,520,808 | 12/1934 | Chippindale | 242/107.7 X |
| 1,908,852 | 5/1933 | Lea | 242/107.7 |
| 1,982,610 | 11/1934 | Harris | 242/107.7 X |
| 2,244,541 | 6/1941 | Marvel | 74/577 S |
| 2,629,630 | 2/1953 | Roark | 242/107.7 X |
| 2,907,534 | 10/1959 | Benstein | 242/86 |
| 2,990,132 | 6/1961 | Mills | 74/577 X |
| 3,490,715 | 1/1970 | Nicpon | 242/107.7 |
| 3,596,849 | 8/1971 | Tamarin | 242/107.7 |

*Primary Examiner*—John M. Jillions
*Attorney, Agent, or Firm*—Andrus, Sceales, Starke & Sawall

[57] ABSTRACT

The invention provides a latching mechanism including a pawl, a ratchet wheel having a recess engageable with the pawl to restrict rotation of the wheel in one direction and cam means associated with the wheel and operative on rotation thereof in said one direction to urge the pawl away from the recess. The pawl is biased solely by gravity to move toward the recess whereby to enable engagement in said recess. The gravity bias acting on the pawl will be insufficient to cause the pawl to be in a position to engage said recess when the angular velocity of the wheel is in excess of a predetermined latching velocity. The latching mechanism may be used in a winding apparatus for hose.

28 Claims, 26 Drawing Figures

LATCHING MECHANISM AND WINDING APPARATUS INCLUDING SAME

CROSS REFERENCE TO RELATED APPLICATION

The present application is a continuation-in-part application of U.S. Pat. application Ser. No. 698,308, filed June 21, 1976 and now abandoned.

BACKGROUND OF THE INVENTION—FIELD OF THE INVENTION

The present invention relates to a reeling device having a releasable return latch and to the latch mechanism therefor.

BACKGROUND OF THE INVENTION—DESCRIPTION OF THE PRIOR ART

Winding devices for holding hose, wire, cables, and other flexible linearly extendable members are known, as also are reels which are biased to reel up the linearly extendable member after initial paying out of the member from the reel. With such biased reels, it is preferred that means be provided to prevent reeling up of the member until such time as such reeling up is desired.

Typical of such winding devices may be that used for hoses, such a garden hose. The winding device with the hose stored on a reel contained therein may be placed adjacent the spigot and the hose payed out to supply water to a desired location in the garden. At the end of the watering, the hose is rewound in the winding device. While the hose is usually of considerable length, it may be payed out in a wide variety of intermediate positions, including very short lengths, so that the winding device is subjected to a diverse range of conditions in operation.

Winding devices of the type to which the present invention is directed employ a spring which is wound up as the hose is pulled off the reel. The stored energy of the wound spring is thereafter used to wind the hose back on the reel.

Latch mechanisms are used to control the paying out and winding up action of the winding device.

In general, these mechanisms typically permit the reel to freely rotate in the unwind direction and hold the reel stationary once the desired length of hose has been payed out. In the windup direction, the latch mechanism is responsive to the speed of the reel, permitting wind up of the hose as long as a certain reel speed is maintained.

The particular requirements of winding devices of the type described above have rendered existing latch constructions less than satisfactory when used in such devices. For example, handling a long length of hose will involve a large number of revolutions and a wide range of spring tension forces. This tends to result in a wide range of wind up reel speeds over which the latch mechanism must operate.

Preferably, the latch construction must be one which establishes a precisely defined speed out of the wide range of speeds at which latching occurs and then provides positive latching at that speed with minimal speed error. It is further desirable that the latch mechanism obtain this positive operation at relatively low reel speed. Low reel speeds occur quite frequently in winding devices of the type described. The friction of the hose on the ground may reduce the speed. Or, the small spring tension produced by a short pay out of the hose may similarly reduce rewind speed. The latch must be capable of satisfactory operation at these low speeds.

Existing latch constructions have been found to possess shortcomings in the establishment of the latching speed, in the speed error attendant latching, and in their operation at the low speeds found in rewind devices.

SUMMARY OF THE PRESENT INVENTION

It is, therefore, the object of the present invention to provide an improved winding device and latching mechanism therefor. The latching mechanism of the present invention obtains a precise definition of latching speed with small error and is capable of operation at low speed.

The winding device and included latch mechanism has a generally circular ratchet wheel rotating with the hose storage reel. A pivoted pawl is biased by gravity to ride on the exterior of the ratchet wheel. The ratchet wheel contains one or more recesses into which the pawl is inserted by the gravity bias to prevent rotation of the wheel in the wind up direction.

A short cam surface extending from the circular periphery of the ratchet wheel immediately ahead of the recess pivots the pawl away from the wheel to avoid engagement with the recess when the ratchet wheel is rotated above a predetermined latching speed, as by the reel rewind spring. The geometry of the cam-recess configuration, including height of the cam and depth of the recess, precisely determines the latching speed which may be sufficiently low to obtain satisfactory operation of a winding device used with hoses or the like. It further permits operation of the mechanism and rewind rotation of the ratchet wheel when the reel is turned through only a small arc such as 30°–45°. This is a convenience to the user as well as being advantageous in commencing wind up of short lengths of hose.

The trailing flank of the recess in the ratchet wheel is undercut to insure that the pawl is drawn into the tooth and captured. The pawl is most unlikely to roll or bounce away from the recess. The operation of the latching mechanism is very positive, reducing the speed error attendant latching operation. The pawl may be provided with a manual override urging it toward or away from the ratchet wheel. There may be a plurality of recesses and associated cams on the ratchet wheel.

The latching mechanism may be made of any suitable material and any suitable way. For example, the ratchet wheel may be made by pressing metal, profile cutting, synthetic plastic molding, or by mold or die casting techniques.

A specific construction of a latching device in accordance with this invention and a winding device in accordance with this invention will now be described with the aid of the accompanying drawings.

DESCRIPTION OF THE PREFERRED EMBODIMENT

Figures 1, 2, 4:
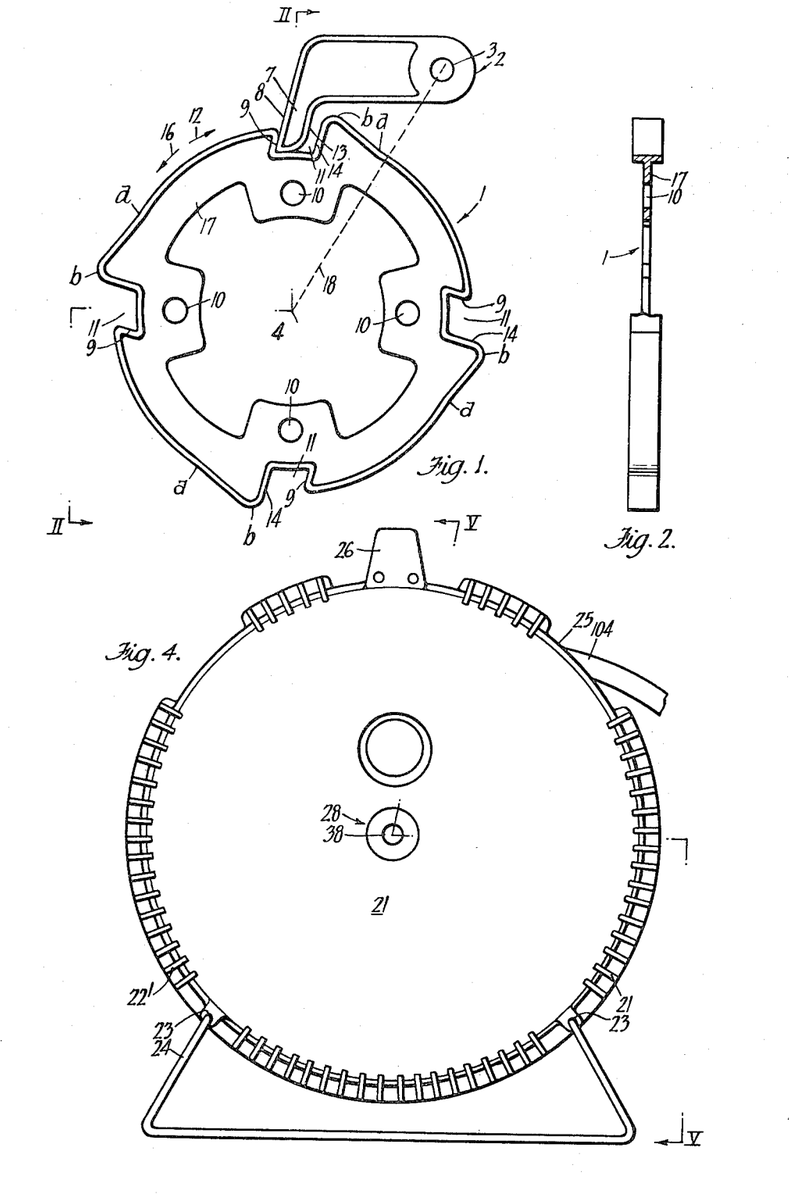
FIG. 1 is a side elevation of the latching mechanism.
FIG. 2 is a cross-sectional view taken approximately on the line II—II in FIG. 1 of part of the latching mechanism.
FIG. 4 is a side elevation of the winding device.

The latching mechanism shown in FIG. 1 comprises a ratchet wheel 1 and pawl 2.

The wheel and pawl are made of synthetic plastics by molding but manufacture from alternative materials and/or by alternative techniques, such a metal pressing, is possible.

The pawl 2 is pivotally mounted by means of a pivot pin 41 (not shown in FIG. 1) passed through hole 3.

The end 7 of the pawl 2 has a surface 8, capable of engaging with the flanks 9 of recesses 11 in the wheel 1 to stop the wheel from rotating in the direction of arrow 12, and a surface 13, capable of being engaged by the flanks 14 of the recesses 11 to lift the end 7 out of the recesses 11 when the wheel is rotated in the direction of the arrow 16.

The wheel has mounting holes 10, in a web portion 17.

The periphery of the wheel is based on a circle of particular radius having its centre at point 4 excepting in the regions where the wheel is provided with cam surfaces "a-b".

Figures 25, 26:
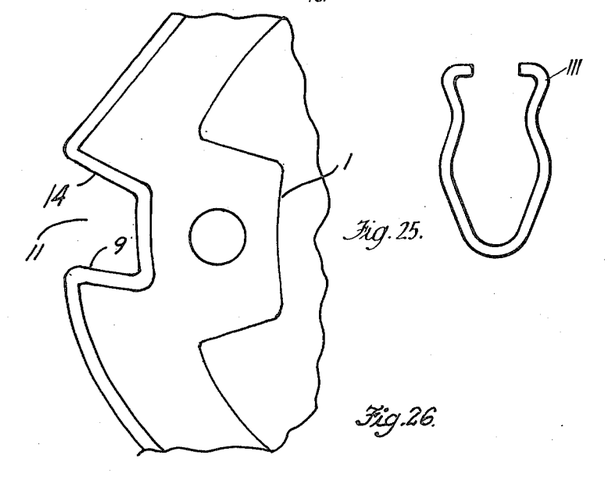
FIG. 25 is a detail of a part shown in FIG. 23.
FIG. 26 is a fragmentary side elevation of a portion of the latching mechanism shown in FIG. 1.

It is to be noted that the flanks 9 and 14 are parallel, although they are preferably outwardly divergent by up to 5° or more (as shown in FIG. 26), and are preferably inclined at an angle of about 15°±5° to a radius on point 4 passing equidistantly between them at their roots. The 15° angle is an effective latch capture angle which insures the well defined, positive action of the latching mechanism.

The depth of the recess 11, measured from the periphery of said circle, is preferablyl 0.125 of the radius of said circle. The maximum radial outward extent of the cam surfaces a–b is preferably said radius of said circle plus 0.125 thereof. As shown in FIG. 1, the cam surfaces a–b may comprise a ramp terminating in and followed by a fall into recess 11. The cam surface may occupy an arc of about 20° of the periphery of ratchet wheel 1. The falls of the cam surfaces, measured from their greatest radial outward extent at point b, are preferably 0.25 of said radius of said circle thereby to insure desired latching speed properties particularly low speed properties, to the latching mechanism. Recess 11 may occupy a peripheral arc of about 15° of ratchet wheel 1.

The manner of operation of the latching mechanism shown in FIG. 1 will now be described.

When the wheel 1 is rotated in the direction of arrow 16 the flanks 14 engage with the surface 13 and push the end 7 out of the recesses 11 so that rotation of the wheel is not hindered.

When the wheel 1 is rotated in the direction of arrow 12, commencing from a position in which the end 7 is not in one of the recesses 11, the surface 13 will follow the periphery of the wheel and engagement with the cam surfaces a—b will cause the end 7 to be moved outwardly of the wheel. The mass of the end 7 will, under gravity, cause a restoring force to act to move the end 7 toward the wheel, but if the angular velocity of the wheel is greater than a predetermined angular velocity, the end 7 will not be brought into position in sufficient time to engage one of the recesses 11, but will instead engage the periphery without stopping rotation of the wheel in the direction of arrow 12.

However, if the angular velocity of the wheel is less than said predetermined angular velocity, gravity will have sufficient time to act so that the end 7 will locate in one of the recesses 11 and stop the rotation of the wheel in the direction of arrow 12.

Figure 3:
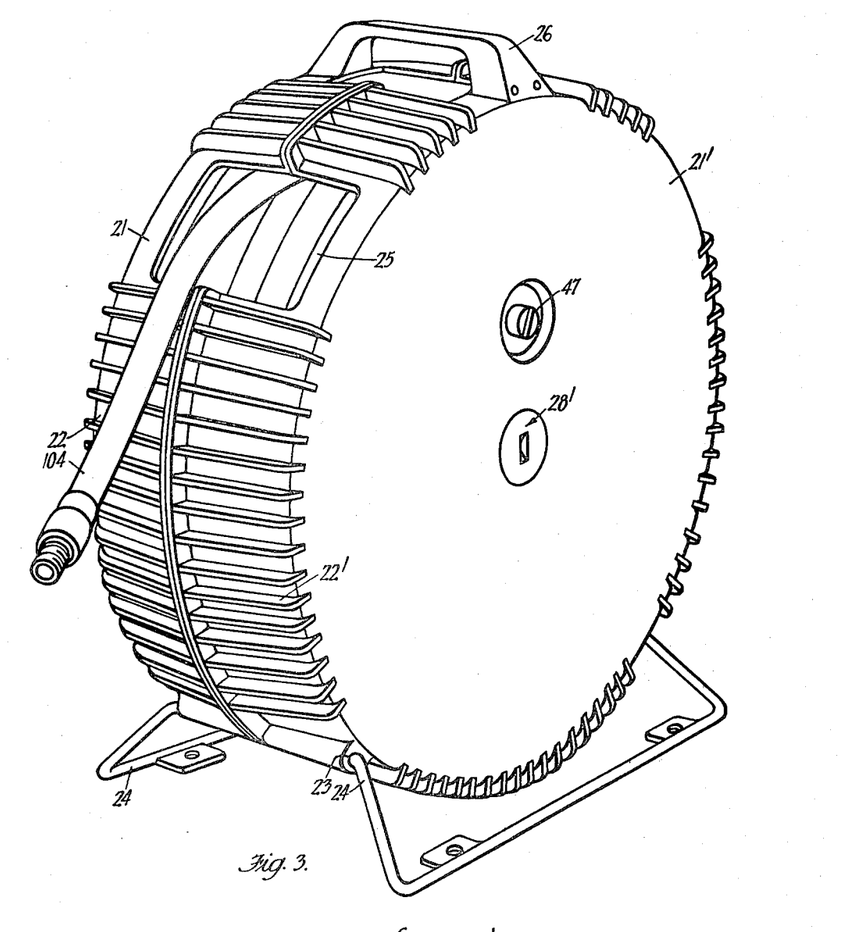
FIG. 3 is a perspective view of a winding device incorporating the latching mechanism of FIGS. 1 and 2.

Thus, the latching mechanism shown in FIG. 1 is of use to latch but only when the wheel speed is less than a predetermined angular velocity. The position and dimension of the cam and its associated recess define the latching speed of the latching mechanism and particularly define that speed as sufficiently low as to insure proper operation of apparatus such as the winding device shown in FIGS. 3 et seq. Only a small amount of rotation, such as 30°–45° in the direction of arrow 16 is necessary to unlatch the mechanism and obtain rotation in the direction of arrow 12.

The undercut flank 9 of recess 11 and appropriately profiled end 7 of Panel 2 make it most unlikely that end 7 will roll or bounce away from recess 11, insuring positive latching action at the defined latching speed with little error.

The latching mechanism shown in FIG. 1 has four recesses 11 but could have more or less. Further, by the use of a single, or preferably two, pawls and with cam surfaces on each side of the recesses 11, stopping or rotation in either direction can be achieved when the angular velocity of the wheel is sufficiently low.

In a preferred modification, the wheel 1 and pawl 2 are mounted so that the dash line 18 in FIG. 1 is vertical.

Figure 5:
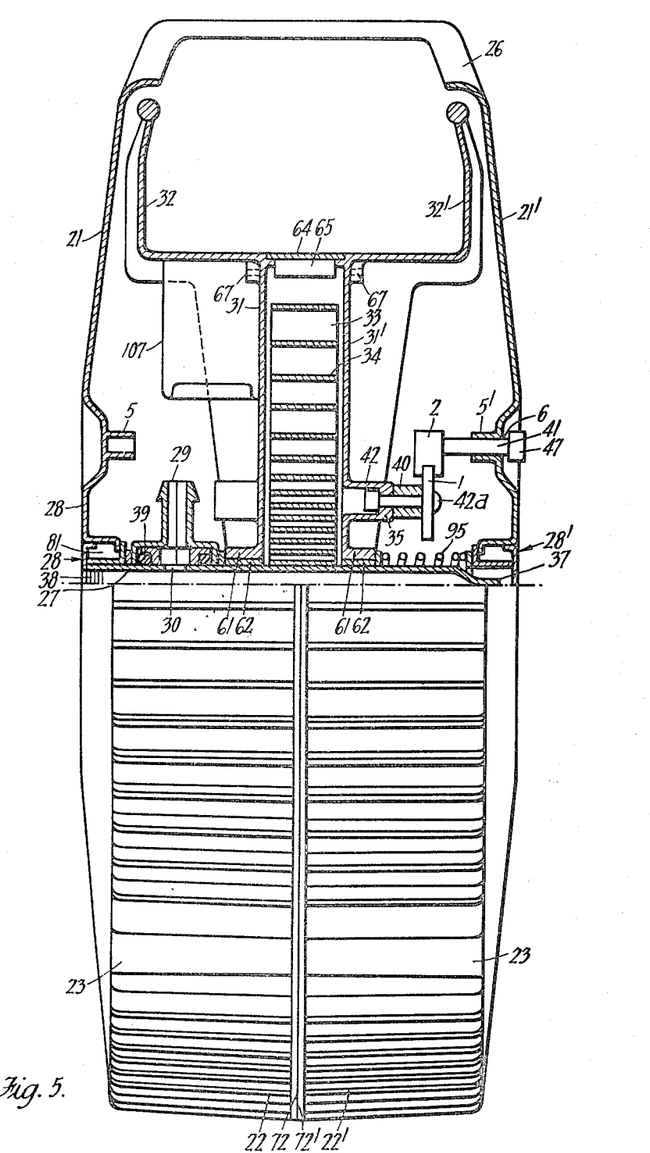
FIG. 5 is a cross-sectional view taken approximately on the line V—V in FIG. 4 with certain parts omitted for clarity.

An application of the latching mechanism shown in FIG. 1 is shown in the winding device of FIGS. 4 and 5.

In FIGS. 4 and 5, the winding device includes identical moulded plastics side covers 21 and 21', a protectively surrounding grille 22 and 22' which is integrally formed with the side covers, mounting holes 23 for legs 24 and which may be used for ground support or, if appropriately located, for mounting the winding device to a vertical support, a hose entry 25, a carrying handle 26, a hollow shaft 27 which is mounted to the side covers 21 and 21' by mounting means 28 and 28', a swivel unit 29 which is mounted on the shaft 27 and which is in fluid communication therewith through aperture 30; a reel including sides 31 and 31' including a hose carrying portions 32 and 32', an annular enclosed space 33 in which a spiral spring 34 is located and which spring is attached at one end to the reel and, at the other end, to the shaft 27 and mounting bosses 35; a spring 95, the wheel 1 and the pawl 2 of the beforedescribed latching mechanism.

The shaft 27 is sealed at its end 37 and has a threaded end 38 to which a hose or a coupling can be attached.

The swivel 29 has O-ring seals 39.

The wheel 1 is mounted to the reel by bolts 42a which pass through spacers 40 and engage nuts 42 in bosses 35.

The pawl is pivotally mounted by the pivot pin 41 which is passed through hole 3. The pin 41 passes through a sleeve 5' and an opening 6 in the side cover 21' and is attached to a T-handle 47 by means of which the pin 41 may be rotated manually to lift the pawl out of engagement with the recesses 11. It is to be noted that side cover 21 has a sleeve 5 but no opening equivalent to 6 which is formed inside cover 21' by punching out.

Figure 6:
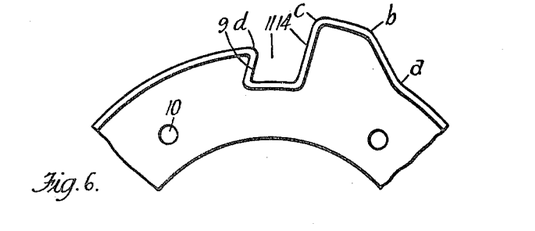
FIG. 6 is a fragmentary side elevation of an alternative part which may be used in the latching mechanism.

In use, the latching mechanism will be normally arranged to allow hose to be payed out from the reel of the winding device with the wheel 1 rotating in the direction of arrow 16 (see FIG. 1). When the wheel is rotated to wind in the hose, the wheel 1 will rotate in the direction of arrow 12 (see FIG. 1) and, dependant on the angular velocity of the wheel, which can be slowed by a user holding on the hose, the pawl 2 will or will not engage with the wheel 1. Release of the pawl 2 can be had by turning the handle 47 as mentioned or by withdrawing hose and then quickly releasing it.

Where necessary, the angular velocity below which latching will occur can be varied by counterbalancing the end 7, and the maximum radially outward extent of the cam surface a-b. In some instances, it may be desirable that the cam surfaces a-b are succeeded, relative to the rotation in the direction of arrow 16, by a surface of constant radius. An example of the latter is shown in FIG. 6 (in which like numerals represent like parts) in which the surface a-b is succeeded by surface b-c. This surface b-c will carry the end 7 after it falls subsequent to rising under the action of surface a-b so that the distance that the end 7 must fall to engage in the recess 11 is the difference between the radial distances to points c and d which will not be more than the distance which the end 7 must fall if surface b-c was omitted and surface a-b was immediately adjacent the recess 11.

Additional features of the winding device are shown in FIG. 5 and in Figures subsequent to FIG. 6.

Figure 7:
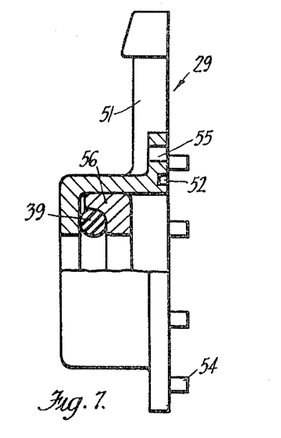
FIG. 7 is a partly cross-sectional, partly side elevational view of a part of the winding device.
Figure 8:
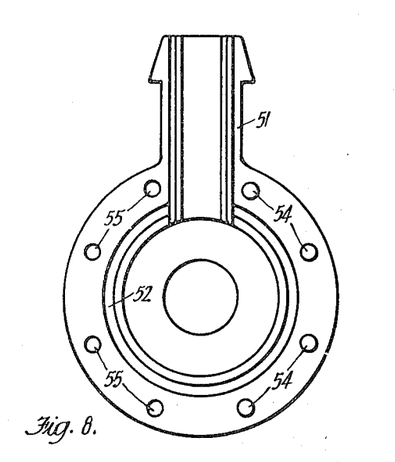
FIG. 8 is an end view of the part shown in FIG. 7.
Figure 9:
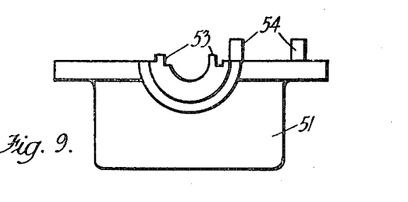
FIG. 9 is a top view of the part shown in FIG. 7.
Figure 10:
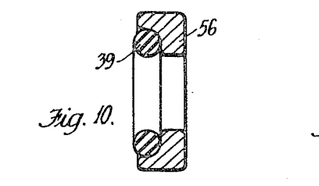
FIG. 10 is a cross-sectional view of another part of the winding device.
Figure 11:
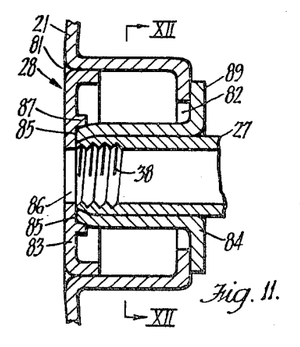
FIG. 11 is a cross-sectional view of one axle support means.
Figure 12:
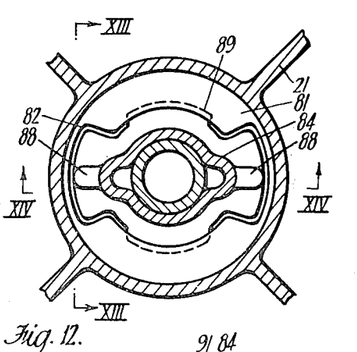
FIG. 12 is a cross-sectional view taken on line XII—XII in FIG. 11.
Figure 13:
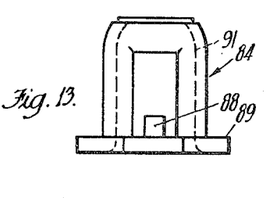
FIGS. 13 and 14 are cross-sectional views taken on lines XIII—XIII and XIV—XIV in FIG. 12.
Figure 14:
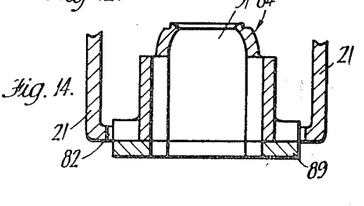

The swivel 29 is formed of two identical synthetic plastics mouldings one of which is shown in FIGS 7-9. Each of those mouldings includes a half spigot 51, a groove 52 for receiving a seal, and mating formations 53 and pins 54 and holes 55 which enable the two mouldings to be put together and interengage. Also forming part of the swivel is the aforementioned O-ring seals 39 which are held in place by annuli 56 shown in FIG. 7 in FIG. 10.

The mounting means 28 is shown in FIGS. 11-14 and comprises a recess 81 and keyhole aperture 82 (see FIG. 12) in the side cover 21. A support is mounted in that recess and to that aperture and comprises two parts 83 and 84 which are joined together at 85. Part 83 has a hole 86 therein for connection of a hose with the shaft 27 and is provided with an annular land 87 which assists in locating and securing of part 84.

The part 84 has lugs 88 thereon which engage with the keyhole aperture 82 to restrict rotation, a flange part 89 (shown partly in dash lines in FIG. 12) which is slightly larger than part of aperture 82 but which is force fittable therethrough and a circular bore 91 which supports the shaft 27. The mounting means 28 also comprises other parts which are not pertinent to means 28 but which have a function as described below.

The mounting means 28' shown in FIGS. 15-19 is similar to mounting means 28' and parts thereof are common or originate from a common mold.

In this respect, side cover 21' is from the same mold as side cover 21 and thus has a recess 81' and apertures 82'. Further, the means 28' also includes a support comprised of secured together parts 83' and 84' which are from the same mold as parts 83 and 84 and have identical elements which bear the same reference numerals as were used in FIGS. 11-14 but being differenced by a prime. The following difference is however to be noted and is that there is no hole 86 but rather there is a web 86' (which can be punched or drilled out to form hole 86) which has a screw driver recess 92' therein. Further, part 84' has a non-circular bore 93' which is present in part 84 but was not discussed in respect thereof. That bore 93' receives a flattened end 94 of shaft 27.

Figure 15:
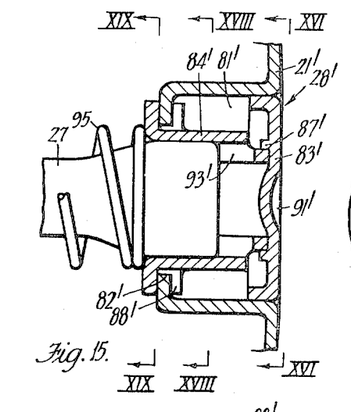
FIG. 15 is a cross-sectional view of another axle support means.
Figure 16:
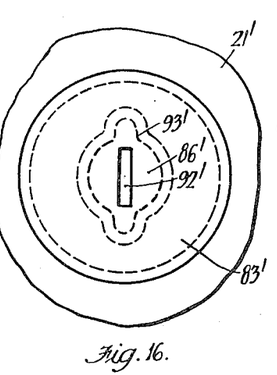
FIG. 16 is a view taken on line XVI—XVI in FIG. 15.
Figure 17:
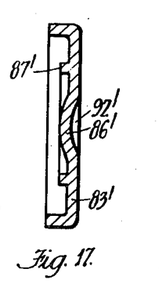
FIG. 17 is a cross-sectional view of the part shown in FIG. 16.
Figure 18:
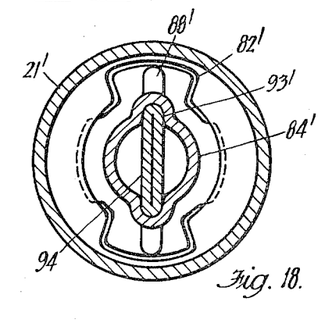
FIG. 18 and 19 are cross-sectional views taken on lines XVIII and XIX in FIG. 15.
Figure 19:
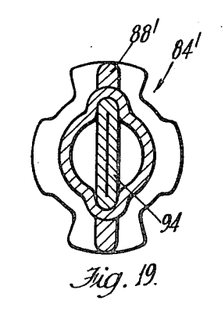

The support comprised of parts 83' and 84' is urged axially outwardly by the spring 95.

As in respect of part 84, the lugs 88' will restrict rotation of part 84'. However, by entering a screw driver into the recess 92' and by pushing against the bias of the spring 95 the lugs 88' can be disengaged from the aperture 82' to permit turning of part 84'. Since the end 94 is received in bore 93' the shaft 27 will also turn and as the spring 34 is attached to the shaft 27 the tension therein can be adjusted.

The reel has sides 31 and 31' as stated and these sides are connected to annuli 61 which are provided with nylon bushes 62 to mount the sides to the shaft 27.

At their radially outer ends the sides 31 and 31' are provided with the hose carrying portions 32 and 32' and also with steps 63 on which a spacer annulus 64 is received. That spacer may be of a width appropriate to space the portions 32 and 32' appropriate to the length of hose to be carried or to make the volume of space 33 appropriate to the spring or springs to be used.

Figure 20:
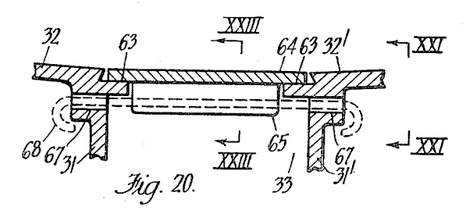
FIG. 20 is a cross-sectional detail of part of the winding device.
Figure 21:
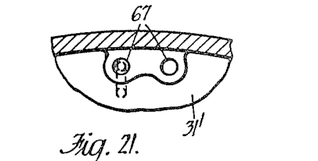
FIG. 21 is a side elevation of the part shown in FIG. 20.
Figure 23:
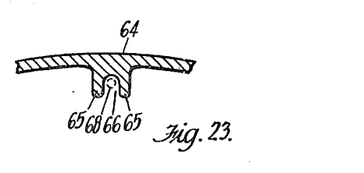
FIG. 23 is a cross-sectional view taken on line XXIII—XXIII in FIG. 20.

The spacer 64 is shown in greater detail in FIG. 20 and 23 and details of the side 31' (side 31 being the same) are shown in FIGS. 20 and 21. The spacer 64 has, at intervals along its inner periphery, pairs of lands 65 having grooves 66 therebetween. The sides 31 and 31' are provided at intervals with bores 67 and pins 68 (shown in dash lines) pass through ones of bores 67 and through grooves 66 and are turned over to locate the spacer 64 with respect to the sides 31 and 31'.

Figure 22:
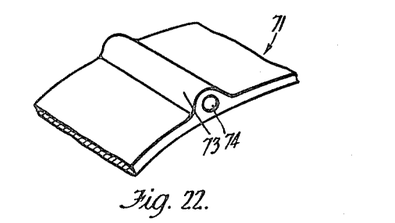
FIG. 22 is a fragmentary perspective view of a part which may be included in the winding device.

In somewhat similar manner to spacer 64, a spacer annulus 71, shown in part in FIG. 22, may be interposed between the edges 72 and 72' of the surrounding grille 22 and 22' to enable an axially wider winding device to be produced.

Spacer 71 is provided with lands 73 having holes 74 therein spaced at intervals along its outer perimeter which will register with the holes 23.

Since it may be desirable to replace a hose carried by the reel it is preferred that a short length of hose 101 is connected to the swivel 29 in a slack loop and terminates in a connector 102 and that that connector 102 is releasably connected to a mating connector 103 which, in turn, is connected to a hose 104 which, by reason of the connectors 102 and 103 may be replaced.

Figure 24:
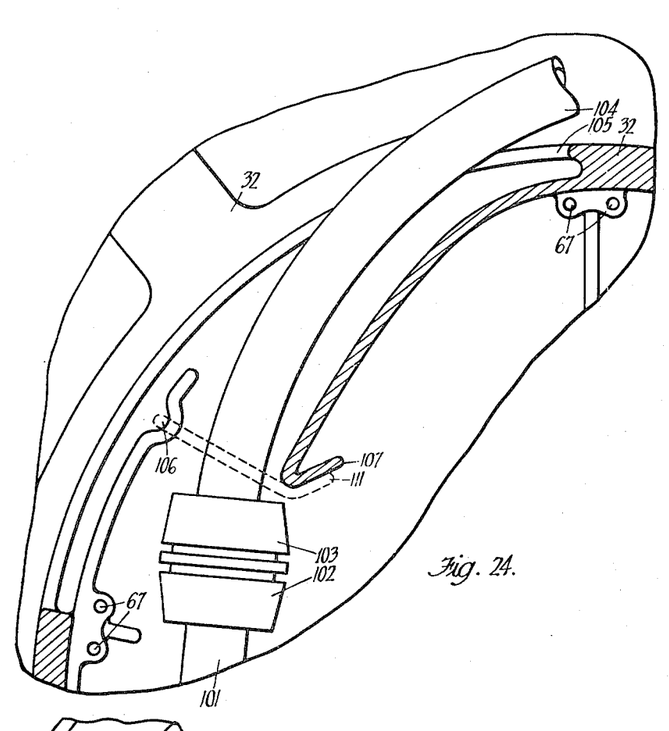
FIG. 24 is a fragmentary side elevational detail of part of the winding device.

To enable ease of replacement the hose 104 passes through a hole 105 in reel part 32 (or 32') and sufficient slack is allowed in said slack loop to enable the connectors to be entirely drawn out of the winding device. However, as it will not normally be desirable that the connectors 102 and 103 should be drawn out of the winding device, a clip 111 is provided (see dash line in FIG. 24 and solid line in FIG. 25) and is retained, at one end, with a formation 106 in the part 32, restricts connector 103 from passing through the hole 105 and hence restricts connector 102 and hose 101 from passing through that hole, and abuts against an arm 107 which is integrally formed with part 32.

Modification and adaptions may be made to the constructions described above without departing from the spirit and scope of this invention which includes every novel feature and combination of features disclosed herein.

Various modes of carrying out the invention are contemplated as being within the scope of the following claims particularly pointing out and distinctly claiming the subject matter which is regarded as the invention.

We claim:

1. A latching mechanism comprising:
   a stationary support means;
   a pawl mounted on said support means for pivotally moving a tooth portion thereof in a generally vertical plane; and
   a ratchet wheel rotatably mounted on said support member and lying in said generally vertical plane, said rachet wheel having a least one recess on the periphery thereof and being mounted on said support means adjacent said pawl so that the tooth of the latter is pivotally biased solely by gravity into contact with the periphery of said wheel and into engagement with said recess to restrict rotation of said wheel in one direction, said recess being formed by a pair of peripherally spaced straight flanks terminating at the bottom of said recess, one of said flanks comprising a trailing flank in said one direction of rotation which slants angularly inward against said one direction of rotation at an angle of about 15°±5° with respect to a radius passing equidistantly between said flanks at their bottom terminii to provide a surface capturing said pawl in said recess when said pawl engages said recess, said ratchet wheel having an outwardly extending cam means limited to a predetermined portion of the periphery of said ratchet wheel immediately ahead of said recess in said one direction of rotation, said cam means being contactable by said pawl for providing pivotal movement to said pawl opposite to that obtained by the gravity bias, said cam means being preceded by a peripheral portion of said ratchet wheel having a generally constant radius, said tooth portion of said pawl being formed to engage said trailing flank of said recess for being captured therein, the amount of the pivotal movement of the pawl upon contacting said cam means being responsive to the angular velocity of said wheel in said one direction and being such that said gravity bias acting on said pawl will be insufficient to cause said pawl to engage said tooth when the velocity of said wheel is in excess of a predetermined latching speed.

2. The latching mechanism as claimed in claim 1 wherein said cam means occupies a peripheral arc of approximately 20° to 25° on said ratchet wheel.

3. The latching mechanism as claimed in claim 2 wherein said recess occupies a smaller peripheral portion than said cam means.

4. The latching mechanism as claimed in claim 3 wherein said recess occupies a peripheral arc of approximately 15° on said ratchet wheel.

5. The latching mechanism as claims in claim 1 wherein said flanks are parallel to each other.

6. The latching mechanism as claimed in claim 1 wherein said flanks are outwardly divergent.

7. The latching mechanism as claimed in claim 6 wherein said flanks are outwardly divergent by an angle of up to 5°.

8. The latching mechanism as claimed in claim 1 wherein said ratchet wheel includes a plurality of recesses.

9. The latching mechanism as claimed in claim 1 wherein the depth of the recess equals the height of said cam means.

10. The latching mechanism as claimed in claim 9 wherein the depth of said recess and the height of said cam equals 0.125 of the radius of said ratchet wheel.

11. The latching mechanism as claimed in claim 1 wherein said cam means includes an outwardly extending ramping surface immediately succeeded by a fall.

12. The latching mechanism as claimed in claim 1 wherein said cam means includes an outwardly extending ramping surface succeeded by a peripheral portion having a generally constant radius greater than the radius of said ratchet wheel and terminating in a fall.

13. A latching mechanism as claimed in claim 1 further including manually operable means coupled to said pawl for raising said pawl to an inoperative position.

14. A latching mechanism as claimed in claim 1 wherein said pawl is mounted above the ratchet wheel.

15. A latching mechanism as claimed in claim 1 wherein the pivot for said pawl on said support means and the center of rotation of said rachet wheel are in vertical alignment.

16. A hose winding device including:
    a stationary frame;
    a reel rotatably mounted on said frame for holding, paying out, and winding in a hose;
    means biasing said reel in a direction of rotation which winds in the hose; and
    a latching mechanism comprising:
    a stationary support means coupled to said frame:
    a pawl mounted on said support means for pivotally moving a tooth portion thereof in a generally vertical plane; and
    a ratchet wheel rotatably mounted on said reel and lying in said generally vertical plane, said ratchet wheel having at least one recess on the periphery thereof and being mounted on said reel adjacent said pawl so that the tooth of the latter is pivotally biased solely by gravity into contact with the periphery of said wheel and into engagement with said recess to restrict rotation of said wheel in the wind in direction, said recess being formed by a pair of peripherally spaced straight flanks terminating at the botom of said recess, one of said flanks comprising a trailing flank in said wind in direction of rotation which slants angularly inwrd against said wind in direction of rotation at an angle of about 15°±5° with respect to a radius passing equidistantly between said flanks at their bottom terminii to provide a surface capturing said pawl in said recess when said pawl engages said recess, said ratchet wheel having an outwardly extending cam means limited to a predetermined portion of the periphery of said ratchet wheel immediately ahead of said recess in said wind in direction of rotation, said cam means being contactable by said pawl for providing pivotal movement to said pawl opposite to that obtained by the gravity bias, said cam means being preceded by a peripheral portion of said ratchet wheel having a generally constant radius, said tooth portion of said pawl being formed to engage said trailing flank of said recess for being captured therein, the amount of the pivotal movement of the pawl upon contacting said cam means being responsive to the angular velocity of said wheel in said one direction and being such that said gravity bias acting on said pawl will be insufficient to cause said pawl to engage said tooth when the velocity of said wheel is in excess of a predetermined latching speed.

17. A hose winding device as claimed in claim 16 wherein said means biasing the reel is capable of causing the reel to rotate in excess of said predetermined latching speed.

18. The hose winding device as claimed in claim 16 wherein said cam means occupies a peripheral arc of approximately 20° to 25° on said ratchet wheel.

19. The hose winding device as claimed in claim 19 wherein said recess occupies a smaller peripheral portion than said cam means.

20. The hose winding device as claimed in claim 16 wherein said flanks are parallel to each other.

21. The hose winding device as claimed in claim 16 wherein said flanks are outwardly divergent.

22. A hose winding device as claimed in claim 21 wherein said flanks are outwardly divergent by an angle of up to 5°.

23. The hose winding device as claimed in claim 16 wherein the depth of the recess equals the height of said cam means.

24. The hose winding device as claimed in claim 16 wherein said cam means includes an outwardly extending ramping surface immediately succeeded by a fall.

25. The hose winding device as claimed in claim 16 wherein said cam means includes an outwardly extending ramping surface succeeded by a peripheral portion having a generally constant radius greater than the radius of said ratchet wheel and terminating in a fall.

26. A hose winding device as claimed in claim 16 further including manually operable means coupled to said pawl for raising said pawl to an inoperative position.

27. A hose winding device as claimed in claim 16 wherein said pawl is mounted above the ratchet wheel.

28. A hose winding device as claimed in claim 16 wherein the pivot for said pawl on said support means and the center of rotation of said ratchet wheel are in vertical alignment.

* * * * *